United States Patent [19]

Faltus

[11] 4,364,463
[45] Dec. 21, 1982

[54] TURNOVER CONVEYOR

[76] Inventor: Arthur V. Faltus, 1643 LaSalle St., Belleville, Ill. 62221

[21] Appl. No.: 206,094

[22] Filed: Nov. 12, 1980

[51] Int. Cl.$^3$ ............................................. B65G 47/24
[52] U.S. Cl. .................................. 198/405; 198/402; 198/605; 198/817
[58] Field of Search ........ 198/405, 408, 411, 604–605, 198/626–628, 817, 861

[56] References Cited

U.S. PATENT DOCUMENTS

| | | | |
|---|---|---|---|
| 1,249,060 | 12/1917 | Fullerton | 198/605 X |
| 1,332,900 | 3/1920 | Jennings | 198/604 X |
| 2,682,216 | 6/1954 | Shields | 198/604 X |
| 3,543,913 | 12/1970 | Itil | 198/861 |

Primary Examiner—John J. Love
Assistant Examiner—Douglas D. Watts
Attorney, Agent, or Firm—Polster, Polster and Lucchesi

[57] ABSTRACT

In a double wire belt conveyor for conveying newspapers along a line of travel, a series of grooved, wire belt-carrying pulley rolls is provided, spaced along the line of travel and rotatably mounted on axes in planes substantially perpendicular to the line of travel, successive of the rolls being skewed angularly, in the same direction, from the previous roll. Preferably, the skew is about 18 degrees, the number of skewed rolls is 10, the axis of the last of the rolls being substantially 180° skewed from, hence parallel with, the axis of the first, and the entire series extends no more than 10 linear feet along the line of travel.

9 Claims, 4 Drawing Figures

TURNOVER CONVEYOR

BACKGROUND OF THE INVENTION

Double wire belt conveyors for conveying newspapers, in which helically wound wire belts mounted on staggered grooved pulley rolls are overlapped to carry newspapers between them are well known in the art. Such conveyors have conventionally included both horizontal and vertical reaches, but have been in-line. They have usually been driven from one end either from a drive shaft of a rotary press or a separate electric motor, through a chain and sprocket arrangement to drive at least the first of both upper and lower sets of rolls. Occasionally it is desired to invert the newspapers being conveyed. Heretofore there has been no simple way of accomplishing that task within the space limitations of many newspaper printing plants.

One of the objects of this invention is to provide apparatus for inverting newspapers, using standard components of a double wire belt conveyor, within a shorter reach than has been considered possible heretofore.

Another object is to provide such apparatus that is simple, inexpensive, and reliable.

Other objects will become apparent to those skilled in the art in the light of the following description and accompanying drawing.

SUMMARY OF THE INVENTION

In a double wire belt conveyor for conveying newspapers along a line of travel, a series of grooved, wire belt-carrying pulley rolls is provided, spaced along the line of travel and rotatably mounted on axes in planes substantially perpendicular to the line of travel, successive of the rolls being skewed angularly, in the same direction, from the previous roll. Preferably, the skew is about 18°, the number of skewed rolls is ten, the axis of the last of the rolls being substantially 180° skewed from, hence parallel with, the axis of the first, and the entire series extends no more than 10 linear feet along the line of travel. In the preferred embodiment, each of the skewed rolls is mounted to extend chordally in a hoop in such a way as to be selectively adjustable both angularly and toward and away from the line of travel. The axis of rotation of each roll is offset from the line of travel to position the nearest edge of the roll slightly offset away from being tangent to the line of travel. In the preferred embodiment, the line of travel through the series of the skewed rolls is vertical.

DESCRIPTION OF THE PREFERRED EMBODIMENT

Figure 1:
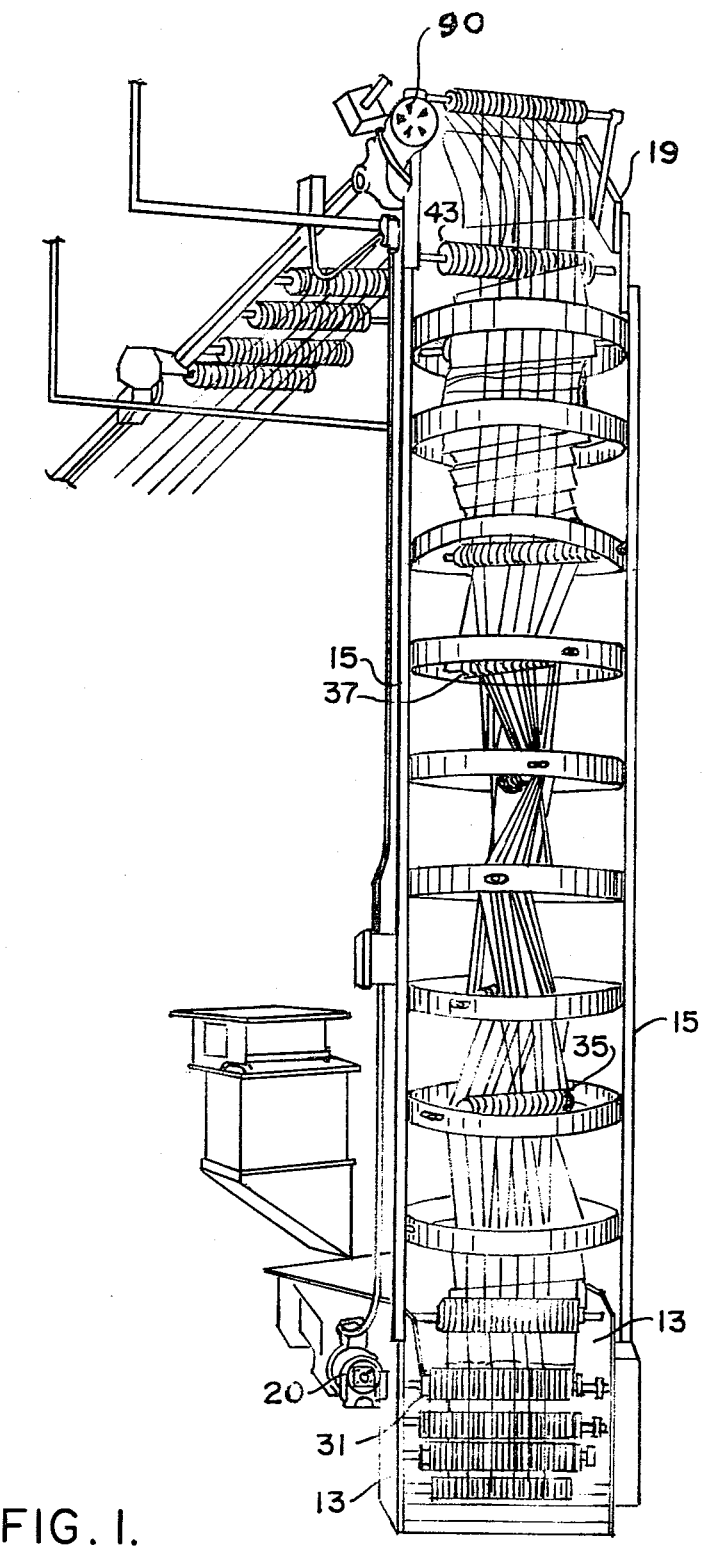
FIG. 1 is a fragmentary view in perspective of one embodiment of a turnover device of this invention.
Figure 2:
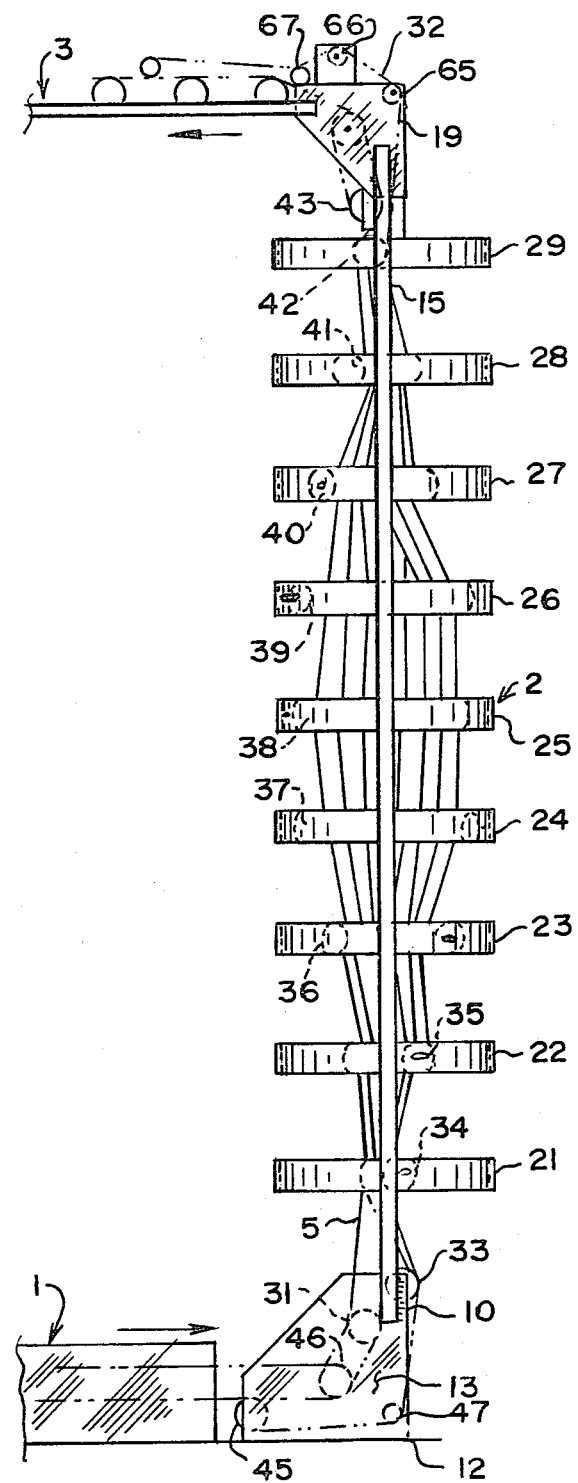
FIG. 2 is a somewhat schematic view in side elevation.

Referring now to the drawing for one illustrative embodiment of turnover device of this invention, and particularly to FIG. 2, reference numeral 1 indicates an in-feed conveyor, by which shingled newspapers are conveyed from the discharge end of the press to a turnover section 2. The turnover section 2, in turn, conveys the shingled newspapers to a take-away conveyor 3, which, in this embodiment, is shown as looped back over the in-feed conveyor 1, the line of travel of the newspapers making a 180° turn. It can be seen that if the turnover section 2 were a simple continuation of the in-feed and take-away conveyors, the newspapers in the take-away conveyor would have been inverted. That is, if a masthead were face up on the papers in the in-feed conveyor, it would be face down in the take-away conveyor. Such an arrangement is undesirable. Accordingly, in the present invention, the turnover section 2 is arranged to turn the newspapers through 180° so that they are discharged into the take-away conveyor in the same orientation as they had in the in-feed conveyor.

The turnover section 2 includes a frame 10 with a base 12 that has side plates 13, stanchions 15 and 16, secured at their lower ends to the side plates 13, and at their upper ends to upper side plates 19, and hoops 21, 22, 23, 24, 25, 26, 27, 28 and 29, equally spaced from one another along the stanchions. The stanchions 15 and 16 are, in the embodiment shown, channels with inturned flanges at their open ends, as shown particularly in FIG. 3. The hoops 21 through 29 are mounted on the stanchions by means of bolts 81, extending through holes 80 in the hoop and engaging a threaded plate 82 that bears against the inturned flanges of the stanchion.

A lower electric gear motor 20 is mounted on the base 10 and connected to drive a lower drive roll 31, journaled on a horizontal axis in suitable bearings mounted on the side plates 13. The drive roll 31 is a grooved pulley of the conventional double wire belt conveyor type. The drive roll 31 is connected by a multiplicity of helically wound endless wire belts 5 to a similarly grooved driven roll 34 mounted for rotation in the hoop 21. A multiplicity of belts 5, running in alternate grooves, connects roll 34 with roll 36, whereby roll 36 is driven. Roll 36 is similarly connected to drive the pulley roll 38, and rolls 40, and 42 are successively in turn connected by endless helically wound wire belts 5, hence to be driven mediately by the drive roll 31.

An upper electric gear motor 90 is mounted on an upper side plate 19, and connected to drive an upper drive roll 32. The upper drive roll 32 is identical with the lower drive roll 31 and is similarly connected by belts 5 to a driven roll 43 which in turn is connected by belts 5 to driven rolls 41, 39, 37, 35, and 33, all as described in connection with driven rolls 34 through 42. The electric motors 20 and 90 are synchronized to drive the belts at the same speeds.

Figure 3:
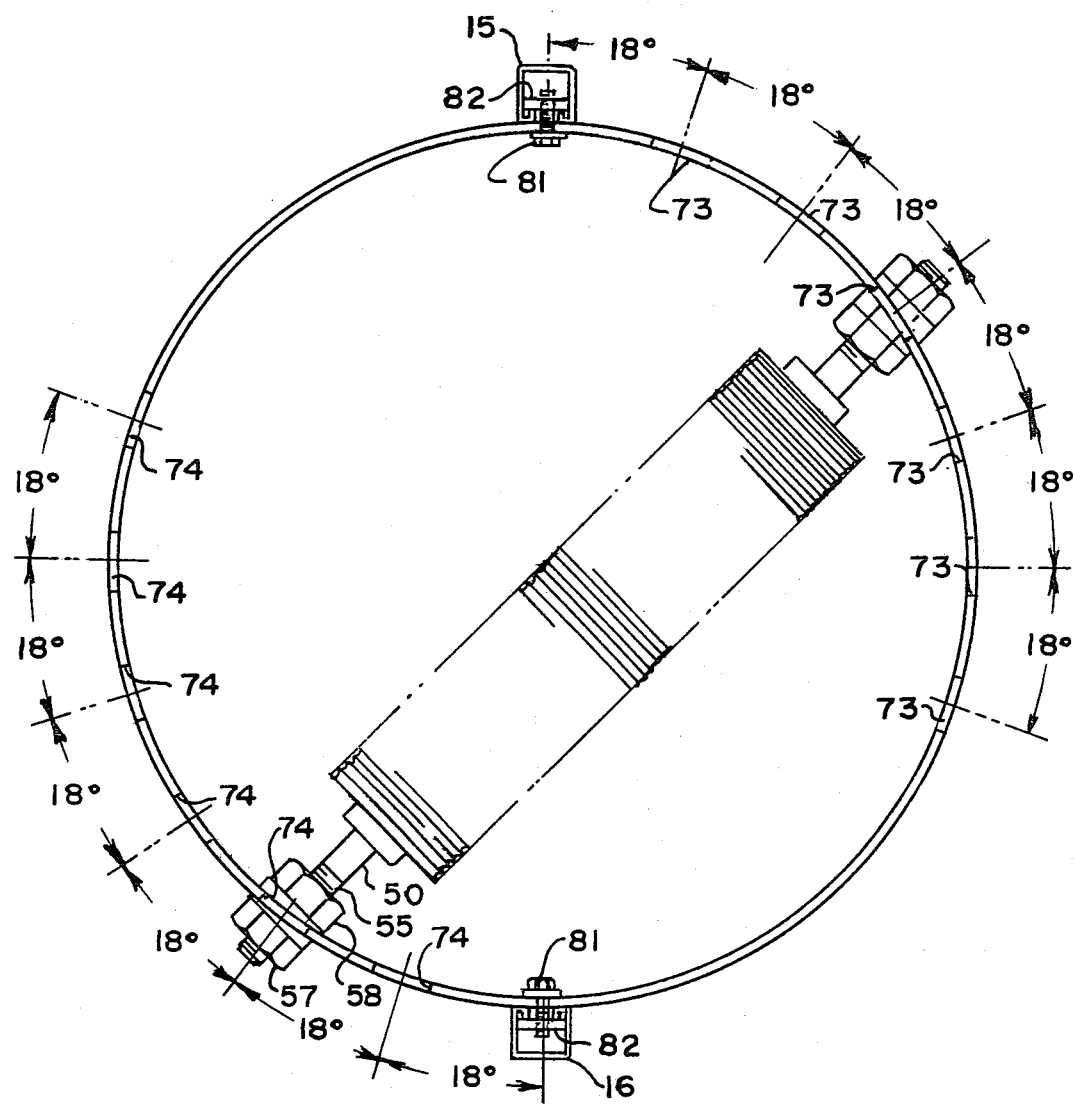
FIG. 3 is a top plan view of one hoop element of this invention, showing the mounting of a grooved pulley roll, the grooves in which are shown only sketchily.
Figure 4:
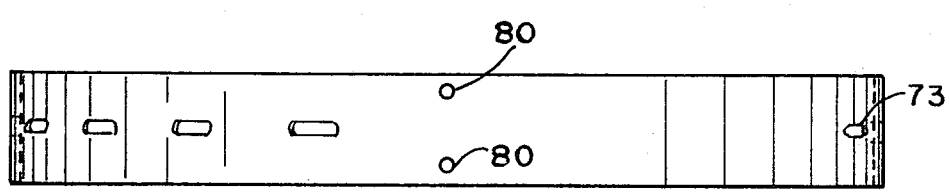
FIG. 4 is a view in side elevation of an unmounted hoop.

The driven rolls 34 through 42 are all revolvably mounted on shafts 50, which, as shown particularly in FIG. 3, are threaded at their outer ends, and project through slots 73 and 74 in the hoops in which the rolls are mounted. Nuts 57 and 58 hold the shaft 50 in position. The slots 73 and 74 are elongated circumferentially. In the illustrative embodiment shown, the slots 73 are on 18° centers extending clockwise from stanchion 15, and the slots 74, on 18° centers extending clockwise from stanchion 16. In this embodiment, there are six slots 73 and six slots 74, extending, center to center, 108° from the center lines of the stanchions 15 and 16, respectively. The rollers 34 through 42 are mounted chordally in such a way that the edge of the roller that lies nearest the diameter of the hoop is still a short distance offset in the direction away from the diameter. That edge is thus slightly offset from a position at which the line of travel is tangent to the roller.

Lower drive roll 31 is on an axis of rotation parallel with the axes of rotation of rolls forming a part of the infeed conveyor 1 and take-away conveyor 3, and driven roll 43 and upper drive roll 32. The first driven roll 34 is skewed about 18° from the axis of the drive roll 31. Each of the succeeding rolls 35 through 42 is skewed about 18°, in the same direction, from the roll preceding it. It can be seen that the hoops 21 through 25 are rotated 180° about the line between the stanchions 15 and 16 from the hoops 26 through 29, in order to locate the slots 73 and 74 properly. The final roll 43 is, in effect, skewed 18° from the roll 42, but because it is on an axis parallel to the axes of the drive rolls, it is unnecessary to mount it in a hoop for adjustment. In practice it has been found that to shorten the height required, skewing the roller 43 a few degrees less than 18 permits a smooth transition to the horizontal take-away conveyor in a shorter distance.

In the base 12, rolls 45, 46 and 47 are part of the infeed system to the turnover section. Wire belts extending around the roll 45 under the roll 46 around the roll 33 down around the idler roll 47 and back to the roll 45, guide the newspapers into the nip between the wires tending around the driven roll 33 and the wires tending around the drive roll 31.

Similarly, rolls 65, 66 and 67 between the upper side plates 19 carry wires from the last of the driven rolls 42 in the ascending series to guide the papers from the roll 43 to the take-away conveyor 3.

Merely by way of illustration, and not of limitation, it has been found that the hoops can be made of $\frac{1}{4}''\times 3''$ hot rolled flat stock, formed into a 23" O.D. ring and butt welded. The slots 73 can be $\frac{3}{8}''\times 3\frac{1}{2}''$. The stanchions can be formed of 2" "Unistrut" steel channels. In practice, a successful conveyor has been made with a total height, from floor to the upper edge of the side plates 19, of ten feet. The hoops were spaced one foot apart, through a height of approximately eight feet.

Numerous variations in the construction of the turnover conveyor of this invention, within the scope of the appended claims, will occur to those skilled in the art in the light of the foregoing disclosure. Merely by way of example, the hoops can be made polygonal and of different dimensions. The slots can be increased in number to make it unnecessary to invert half the hoops. The spacing of the hoops and the overall height of the turnover conveyor can be varied, although it is believed that no more than 12 linear feet need be used. The turnover conveyor can be put at any desired angle, from the horizontal to the vertical. If it is desired to send the take-away conveyor off in a line of travel different from 180° from the infeed conveyor, the number of rolls and the amount of skewing of the rolls can be adjusted accordingly. Other drive means different from the electric motors, such as hydraulic motors or power take-offs from the press, or a chain drive can be used, although the system shown is preferred for its simplicity and versatility. These are merely illustrative.

I claim:

1. In a double wire belt conveyor for conveying newspapers along a line of travel the improvement comprising a series of wire belt-carrying rolls spaced along the line of travel, each rotatably mounted on an axis in a plane substantially perpendicular to the line of travel, successive of said rolls being skewed angularly, in the same direction, from the previous roll, a multiplicity of endless wire belts in sets, the belts in each set extending around two, alternate, rolls in a reach that spans across one intermediate roll, and means for driving the rolls at one end of said series of rolls connected to drive a roll connected by said wire belts to alternate rolls of the series, and at the other end of the series of rolls, connected to drive the other alternate rolls of the series, whereby the skew of any set of wire belts does not exceed the sum of the skews of two successive rolls within the reach of said set of belts.

2. The improvement of claim 1 wherein the angular skew of each successive roll is about 18°.

3. The improvement of claim 2 wherein the number of skewed rolls is 10.

4. The improvement of claim 1 wherein each of a plurality of said rolls is mounted to extend chordally in a hoop.

5. In a double wire belt conveyor for conveying newspapers along a line of travel the improvement comprising a series of wire belt-carrying rolls spaced along the line of travel, each rotatably mounted on an axis in a plane substantially perpendicuar to the line of travel, successive of said rolls being skewed angularly, in the same direction, from the previous roll, each of a plurality of said rolls being mounted to extend chordally in a hoop, each of said rolls having a shaft projecting at each end through a slot in said hoop, said slots being elongated circumferentially to permit selective adjustment of the position of the roll both angularly and toward and away from the diametric.

6. The improvement of claim 1 wherein the line of travel through said skewed rolls is vertical.

7. The improvement of claim 3 wherein the entire series extends no more than 10 linear feet in the direction of the line of travel.

8. The improvement of claim 1 wherein the axis of rotation of each roll is offset from the line of travel to position the nearest edge of the roll slightly offset away from being tangent to the line of travel.

9. In a double wire belt conveyor for conveying newspapers along a line of travel, the improvement comprising a series of wire belt-carrying rolls spaced along the line of travel, each rotatably mounted on an axis in a plane substantially perpendicular to the line of travel, successive of said rolls being skewed angularly, in the same direction, from the previous roll, each of said rolls being mounted to extend chordally in a hoop, each roll having a shaft projecting at each end through a slot in said hoop, said slots being elongated circumferentially to permit selective adjustment of the position of the roll, both angularly and toward and away from the diametric, the axis of rotation of each of said rolls being offset from the line of travel to position the nearest edge of the roll slightly offset away from being tangent to the line of travel, and means for driving the rolls comprising an electric motor at one end of the series of the rolls connected to drive a roll connected to said wire belt to alternate rolls of the series, and another electric motor at the other end of the series of the rolls connected to drive the other alternate rolls of the series.

* * * * *